(12) United States Patent
Winter

(10) Patent No.: US 12,426,731 B1
(45) Date of Patent: Sep. 30, 2025

(54) MATTRESS COVER WITH REMOVABLE FABRIC LAYERS

(71) Applicant: Alex Winter, Van Nuys, CA (US)

(72) Inventor: Alex Winter, Van Nuys, CA (US)

( * ) Notice: Subject to any disclaimer, the term of this patent is extended or adjusted under 35 U.S.C. 154(b) by 0 days.

(21) Appl. No.: 19/090,948

(22) Filed: Mar. 26, 2025

(51) Int. Cl.
*A47G 9/02* (2006.01)
*B32B 5/02* (2006.01)
*B32B 5/26* (2006.01)
*B32B 7/09* (2019.01)

(52) U.S. Cl.
CPC .............. *A47G 9/0246* (2013.01); *B32B 5/02* (2013.01); *B32B 5/26* (2013.01); *B32B 7/09* (2019.01)

(58) Field of Classification Search
CPC .... A47C 31/007; A47C 31/105; A47G 9/0246
See application file for complete search history.

(56) References Cited

U.S. PATENT DOCUMENTS

| | | | | |
|---|---|---|---|---|
| 1,942,287 A | * | 1/1934 | Heitz | A47B 13/086 229/92.8 |
| 3,591,875 A | * | 7/1971 | Zipf, III | A47C 31/105 5/500 |
| 3,761,973 A | * | 10/1973 | Leventhal | A61F 5/485 5/487 |
| 4,899,408 A | * | 2/1990 | Illingworth | A47G 9/02 5/500 |
| 7,120,952 B1 | * | 10/2006 | Bass | A47C 31/105 5/500 |
| 7,487,560 B2 | | 2/2009 | McGrath | |
| 8,464,657 B1 | * | 6/2013 | King | A01K 1/0353 119/28.5 |
| 9,565,955 B2 | * | 2/2017 | Suchman | A47G 9/0246 |
| 2004/0128764 A1 | * | 7/2004 | McGrath | A47C 27/005 5/498 |
| 2004/0163603 A1 | | 8/2004 | Newton | |
| 2005/0177942 A1 | * | 8/2005 | Finn | A47C 31/105 5/502 |
| 2008/0222805 A1 | * | 9/2008 | Saunders | A47C 27/007 5/484 |

* cited by examiner

*Primary Examiner* — Eric J Kurilla
(74) *Attorney, Agent, or Firm* — Trojan Law Offices

(57) ABSTRACT

This invention is directed to mattress cover having a plurality of separately removable fabric layers. Each of the removable fabric layers have a side wall. The side wall of each fabric layer is stitched with a thread to the side wall of the fabric layer below it. Each thread in the stack has a terminal free end that is secured against the side wall by a tape means. The tape means may be removed to pull the terminal free end of the thread to unravel the thread to remove the top most layer for disposal and exposing the next clean layer below it for use.

6 Claims, 3 Drawing Sheets

MATTRESS COVER WITH REMOVABLE FABRIC LAYERS

FIELD OF THE INVENTION

The present invention relates to mattress covers, particularly to pet mattress covers having removable fabric layers.

BACKGROUND

Pet owners provide pet beds for their pets such as dogs and cats to rest and sleep upon as an alternative to pets using furniture or human mattresses. Pet beds typically consist of a mattress pad and a cover. The pet mattress cover becomes littered with hair shed by the pet and other dirt. It is inconvenient to brush out the hair and clean the pet bed often. Whether by handwashing or in a washing machine, cleaning pet mattress covers takes time and can cause cross-contamination with other laundry. For mattress covers that are washable, there is the problem of keeping the pet off the uncovered mattress when the mattress covering is being washed and dried.

There is a need for a disposable pet mattress cover and replacement mattress covers for a pet bed without experiencing the types of problems described above. For these reasons it is an object of the present invention to provide a mattress cover with removable fabric layers. While the invention is described in terms of its advantages for pet mattresses, it is apparent that the invention can also be utilized for human mattresses. Such a mattress for humans is particularly appropriate in infectious disease wards where patients are under quarantine. The mattress cover is a biohazard and should be destroyed rather than risk exposure to cleaning staff. For the same reason, after the last of the mattress covers in the present invention have been removed, the mattress itself will be destroyed rather than re-used. These and other objects are more fully described in the following specification and drawings.

SUMMARY

The present invention provides a mattress cover that eliminates the need to clean a dirty pet mattress while providing pet owners an instantly clean mattress cover in place once the dirty mattress cover is removed. The present invention includes at least two fabric covers that have a planar surface to place on the top surface of a mattress. The top portions of a first fabric cover and a second fabric cover have substantially the same dimension, and thus substantially equal circumferences. The first fabric cover and the second fabric cover have side walls that extend perpendicularly from the circumferences. The side wall of the second fabric cover may be wider than the side wall of the first fabric cover. The side wall of the first fabric may be stitched with a thread to the side wall of the second fabric cover. A terminal free end of the thread is secured with a tape means on the side wall of the first fabric cover. The tape means may be removed to pull the terminal free end of the thread to unravel the thread and so to remove the first fabric cover.

DESCRIPTION

The present invention is described more fully hereinafter, but not all embodiments are shown. While the invention has been described with reference to exemplary embodiments, it will be understood by those skilled in the art that various changes may be made, and equivalents may be substituted for elements thereof without departing from the scope of the disclosure. In addition, many modifications may be made to adapt a particular structure or material to the teachings of the disclosure without departing from the essential scope thereof.

The drawings accompanying the application are for illustrative purposes only. They are not intended to limit the embodiments of the present application. Additionally, the drawings are not drawn to scale. Common elements between different figures may retain the same numerical designation.

Figure 1A:
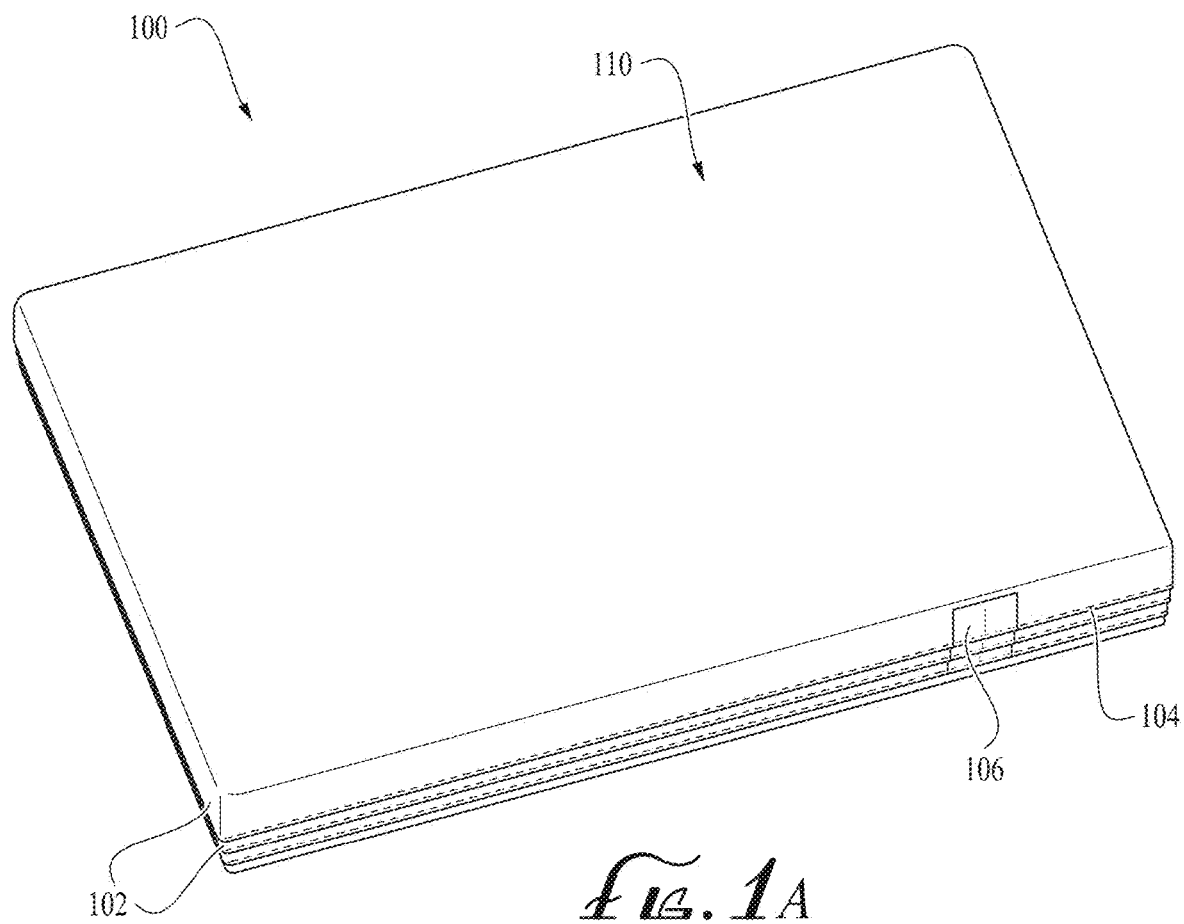
FIG. 1A illustrates a top perspective view of a mattress cover.

Disclosed herein is a mattress cover 100 have two or more fabric layers, each of which is capable of being removed independently of the other layers when in a top position and providing a clean fabric layer for a mattress cover instantly upon removal of the fabric layer in the top position. As shown in FIG. 1A, the mattress cover 100 generally includes a plurality of fabric covers 102, a thread 104, and a tape means 106. The mattress cover 100 has a first fabric cover 108 having a top portion 110 with a planar surface for protecting the top surface of a mattress.

Figure 1B:
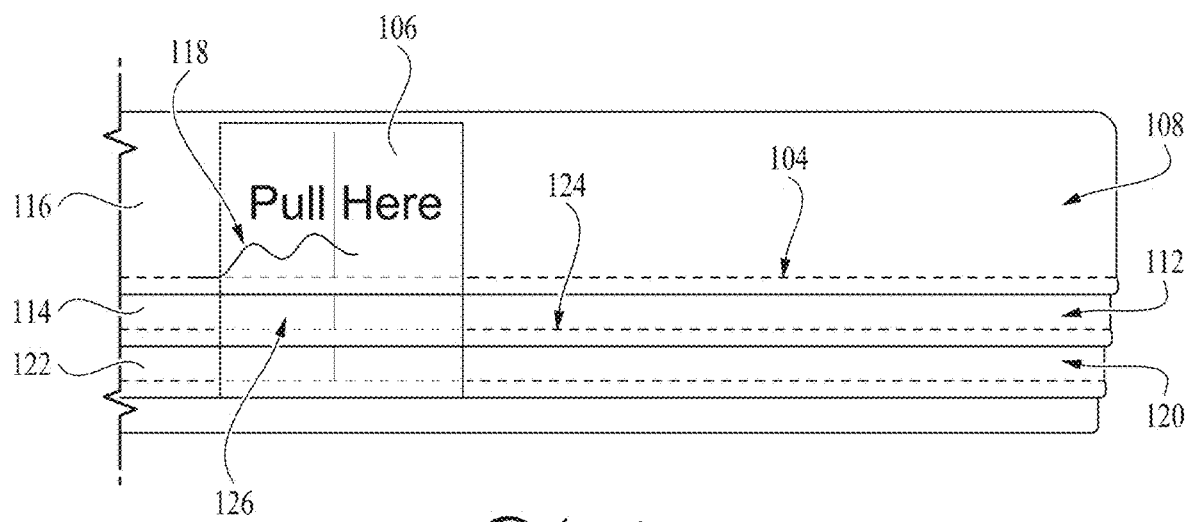
FIG. 1B illustrates a side perspective view of the mattress cover.

A second fabric cover 112 is positioned below the first fabric cover 108 as depicted in FIG. 1B. The dimension of each of the fabric layers should preferably be configured such that an upper layer completely covers the layer beneath it. Thus, the circumference of the first fabric cover 108 is substantially equal to the circumference of the second fabric cover 112. The first fabric cover 108 and the second fabric cover 112 have side walls that extend substantially perpendicular from the circumferences of the respective fabric covers 108, 112. Further, the first side wall 116 of the first fabric cover 108 is stitched with a first thread 104 to the second side wall 114 of the second fabric cover 112.

The first thread 104 has a first terminal free end 118 which is secured to the first side wall 116 of the first fabric cover 108 with a first tape means 106. The first tape means 106 may be removed to pull the first terminal free end 118 of the first thread 104. The invention can have as many additional fabric covers as desired. When a third fabric cover 120 is added to the mattress cover 100, the relationship between the first and second fabric covers 108, 112, is repeated between the second fabric cover 112 and a third fabric cover 120. This relationship repeats with each additional fabric cover added as desired.

Figure 2:
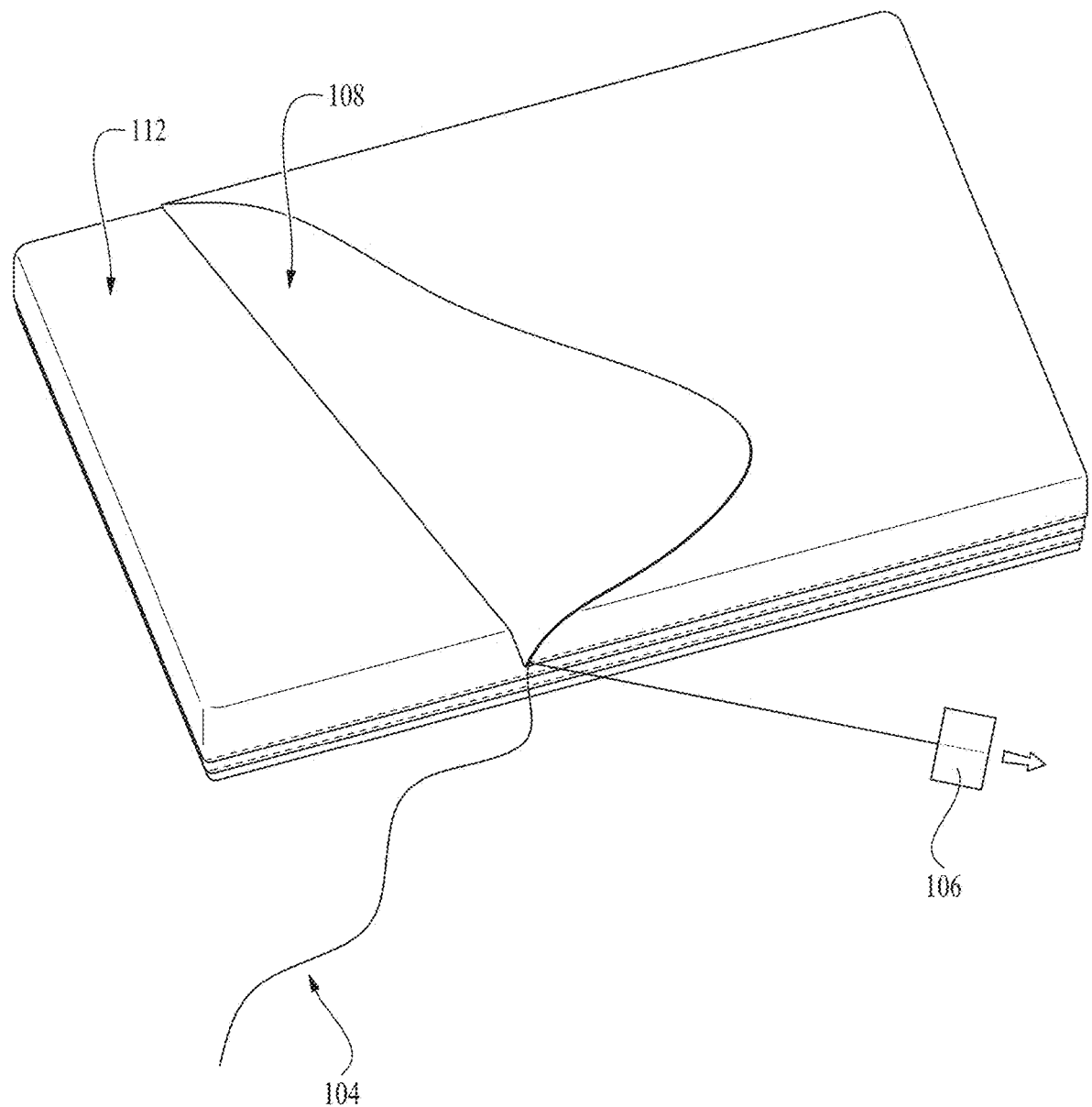
FIG. 2 illustrates a top perspective view of the mattress cover after pulling a tape means.

FIG. 2 shows the first thread 104 in a partially unraveled condition in which the first fabric cover 108 is partially detached from the second fabric cover 112. Once the first fabric cover 108 is removed, the second fabric cover 112 becomes the uppermost fabric layer of the mattress cover 100. Thus, the mattress cover 100 takes away the need to brush out pet hair, wash the mattress cover, and manually secure a clean mattress cover over the mattress pad.

In a preferred embodiment, the mattress cover 100 additionally includes a third fabric cover 120 positioned below the second fabric cover 112. The third fabric cover 120 has a top portion with a planar surface and a third circumference that is substantially equal to the circumferences of the first fabric cover 108 and the second fabric cover 112. The third fabric cover 120 has a third side wall 122 that extends perpendicularly from the circumference. A second thread 124 stitches the second side wall 114 of the second fabric cover 112 to the side wall 122 of the third fabric cover 120. The second thread 124 has a second terminal free end that is secured to the second side wall 114 of the second fabric cover 112 with a second tape means 126. The second tape means 126 may be removed to pull the second terminal free end. Unraveling the second thread 124 detaches the second fabric cover 112 from the third fabric cover 120 and thereby removes the second fabric cover 112 from the mattress cover 100.

The tape means 106 for holding the terminal free end 118 of the first thread 104 against the first side wall 116 can be achieved using any means that serve the function of tape such as adhesive tape, spray adhesive, glue, staples, detachable straps, a fabric pocket in which the terminal free end is tucked, or any other means for holding the terminal free end in place until needed. This is true for every layer of the invention having a terminal free end.

In FIG. 1B, an embodiment is shown in which the second side wall 114 of the second fabric cover 112 is wider than the first side wall 116 of the first fabric cover 108. This pattern is repeated with the third side wall 122 of the third fabric cover 120 being wider than the second side wall 114 of the second fabric cover 112. This relationship between adjacent side walls is repeated with each additional fabric cover added as desired.

Figure 3:
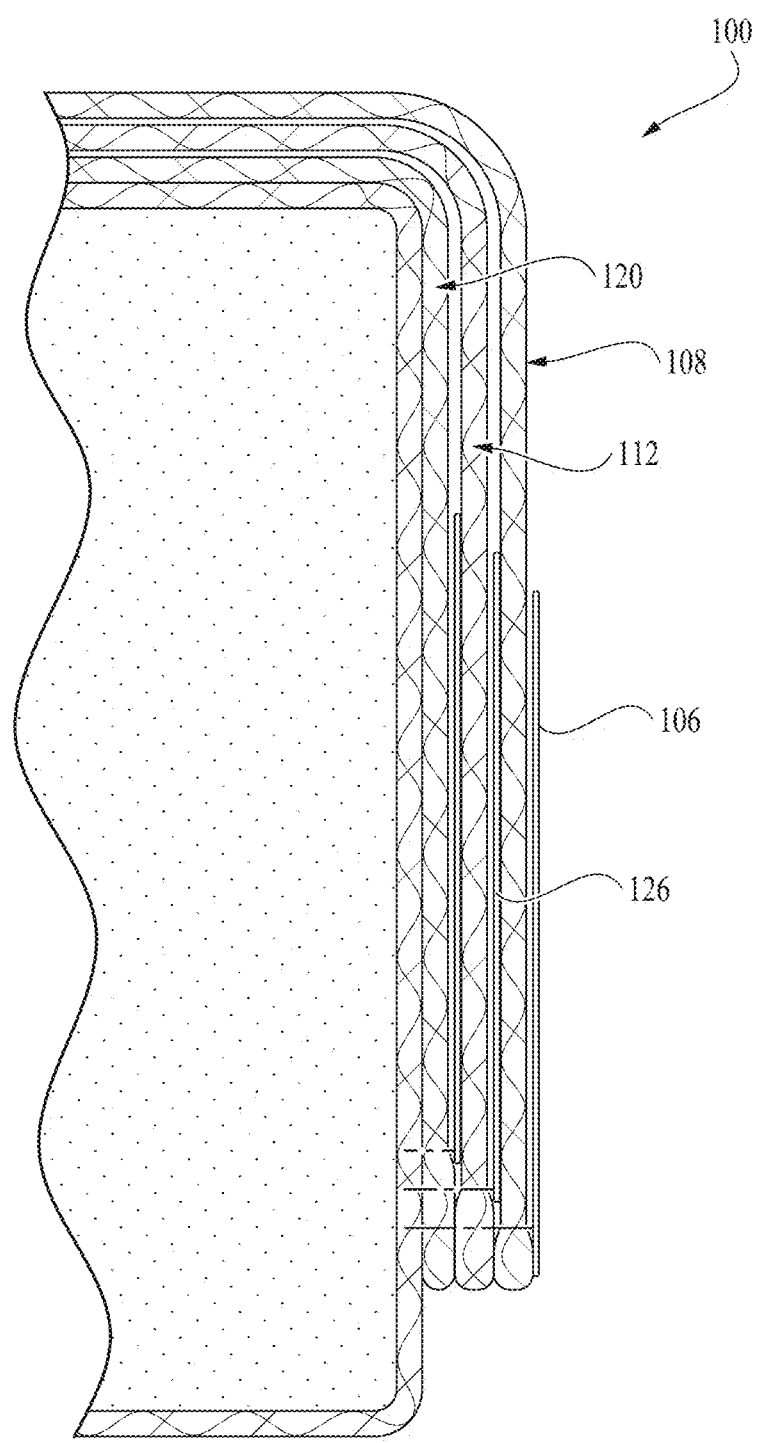
FIG. 3 illustrates a cross-sectional view of the mattress cover.

In an alternative embodiment shown in FIG. 3, the second side wall 114 of the second fabric cover 112 may be of equal width to the first side wall 116 of the first fabric cover 108 as shown in FIG. 3. In that case, the third side wall 122 of the third fabric cover 120 may also be of equal length to the second side wall 114 of the second fabric cover 112 as shown in FIG. 3. The key to the success of any embodiment in which the side walls are of equal width is that the stitching for each layer must be staggered so the stitching for each layer is not positioned on top the stitching for the layer below it to avoid interference between stitching layers when the stitching for a top layer is unraveled for removal of the layer. It should also be understood that any combination of equal or disparate widths can be used so long the stitching is staggered.

The depth of the stitching can vary without departing from the purpose of the invention. The side wall of each fabric layer may be stitched with a thread to the side portion of the fabric layer immediately below it in the stack. Or the side wall of each fabric layer may be stitched to the side wall of more than one fabric layer below it. In other embodiments, the side wall of each fabric layer may be stitched to the side walls of all fabric layers below it or even all the way to the mattress itself. Regardless of how deep the stitching may descend, each thread has a terminal free end that is secured against the side wall of the layer it is intended to remove when unraveled. Hence, the terminal free end may be pulled to unravel the thread to remove the uppermost fabric layer in the stack.

The number of fabric layers in the stack may be any number so long as the side portions of each fabric layer can be attached to the fabric layer below it. The mattress cover may be in any shape. For example, the mattress cover may be square, rectangular, or circular. Furthermore, the fabric covers may be in any size. For example, smaller fabric covers may be used to fit into a pet bed for cats or small dogs. Other shapes and sizes may be utilized as well without departing from the concepts disclosed herein.

In other embodiments, the fabric covers have other means to removably attach the side portion of each fabric layer to the side portion of the fabric layer below it in the stack. One alternative means for removably attaching the side portions of fabric layers is a single thread chain stitch. Another alternative means for removably attaching the side portions of fabric layers is a fastener. For example, the fastener can be a hook and a loop such as VELCRO®. Another alternative means for removably attaching the side portions of fabric layers is a zipper.

The fabric used is not a limitation of the invention and can be made of any appropriate natural or synthetic fibers or other sheets of material appropriate for the purpose to which the mattress is employed.

Lastly, the system of fabric covers for a mattress according to the embodiments that include a thread stitching the side walls of fabric covers may be utilized as follows. Based on the condition of the first fabric cover 108, such as the accumulation of pet hair and other dirt, a user is to determine whether the first fabric cover 108 should be removed. Next, the user should find the tape means 106 on the first side wall 116 of the first fabric cover 108 and peel the tape means 106. Then the user will pull the terminal free end 118 of the thread and separate the first fabric cover 108 from the second fabric cover 112. The user will remove the first fabric cover 108 to expose the second fabric cover 112 as the uppermost fabric layer that is clean and ready for use. This procedure is repeated for each layer as needed.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claim.

What is claimed is:

1. A plurality of fabric covers for a mattress comprising:
    At least a first fabric cover and a second fabric cover where said first and second fabric covers have a top portion having a planar surface for protecting a top surface of said mattress;
    said top portion of said first fabric cover having a first circumference;
    said top portion of said second fabric cover having a second circumference; said first circumference and said second circumference are substantially equal;
    said first fabric cover having a first side wall extending substantially perpendicular from said first circumference and said first side wall having a first width;
    said second fabric cover having a second side wall extending substantially perpendicular from said second circumference and said second side wall having a second width;
    a first thread stitching said first side wall to said second side wall; said first thread having a first terminal free end; and,
    said first terminal free end secured to said first side wall with a first tape;
    whereby said first tape may be removed to pull said first terminal free end to unravel said first thread to remove said first fabric cover.

2. The plurality of fabric covers of claim 1, wherein said second width being greater than said first width.

3. The plurality of fabric covers of claim 1, wherein said second width being equal to said first width.

4. The plurality of fabric covers for a mattress of claim 1 comprising:
- a third fabric cover where said third fabric cover has a top portion having a planar surface for protecting the top surface of said mattress;
- said top portion of said third fabric cover having a third circumference;
- said second circumference and said third circumference are substantially equal;
- said third fabric cover having a third side wall extending substantially perpendicular from said third circumference and said third side wall having a third width;
- a second thread stitching said second side wall to said third side wall; said second thread having a second terminal free end; and,
- said second terminal free end secured to said second side wall with a second tape; whereby said second tape may be removed to pull said second terminal free end to unravel said second thread to remove said second fabric cover.

5. The plurality of fabric covers of claim 4, wherein said third width being greater than said second width.

6. The plurality of fabric covers of claim 4, wherein said third width being equal to said second width.

* * * * *